(12) United States Patent
Chino et al.

(10) Patent No.: US 12,452,664 B2
(45) Date of Patent: Oct. 21, 2025

(54) INDOOR POSITION AUTHENTICATION METHOD, INDOOR POSITION AUTHENTICATION SYSTEM, AND INDOOR POSITION AUTHENTICATION APPARATUS

(71) Applicants: LOCATIONMIND INC., Tokyo (JP); THE UNIVERSITY OF TOKYO, Tokyo (JP)

(72) Inventors: Koichi Chino, Tokyo (JP); Naoki Kiritani, Tokyo (JP); Wataru Ohira, Tokyo (JP); Ranjit Saurav, Tokyo (JP); Manandhar Dinesh, Tokyo (JP); Ryosuke Shibasaki, Tokyo (JP)

(73) Assignees: LocationMind Inc., Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 18/562,634

(22) PCT Filed: May 13, 2022

(86) PCT No.: PCT/JP2022/020286
§ 371 (c)(1),
(2) Date: Nov. 20, 2023

(87) PCT Pub. No.: WO2022/244704
PCT Pub. Date: Nov. 24, 2022

(65) Prior Publication Data
US 2024/0251242 A1    Jul. 25, 2024

(30) Foreign Application Priority Data
May 20, 2021   (JP) .................. 2021-085681

(51) Int. Cl.
*H04W 12/06* (2021.01)
*H04W 12/63* (2021.01)
*H04W 64/00* (2009.01)

(52) U.S. Cl.
CPC ........... *H04W 12/06* (2013.01); *H04W 12/63* (2021.01); *H04W 64/006* (2013.01)

(58) Field of Classification Search
CPC ....... H04W 12/06; H04W 4/02; H04W 4/029; H04W 12/63; H04W 12/104;
(Continued)

(56) References Cited

U.S. PATENT DOCUMENTS

| | | | |
|---|---|---|---|
| 2015/0222602 A1* | 8/2015 | Steiner | ...... H04K 3/65 713/168 |
| 2016/0302067 A1* | 10/2016 | Shimoshimano | .. G06Q 30/0601 |
| 2022/0104026 A1 | 3/2022 | Yokota et al. | |

FOREIGN PATENT DOCUMENTS

| | | |
|---|---|---|
| CN | 103399295 A | 11/2013 |
| CN | 107153171 A | 9/2017 |

(Continued)

OTHER PUBLICATIONS

Jun. 14, 2022 International Search Report issued in International Patent Application No. PCT/JP2022/020286.
(Continued)

*Primary Examiner* — Kwasi Karikari
(74) *Attorney, Agent, or Firm* — Oliff PLC (57) ABSTRACT

A plurality of wireless devices arranged indoors, and transmitting wireless signals for acquiring position information, are authenticated. A terminal device acquires position information on the basis of the wireless signals received from the authenticated wireless devices. From the terminal device, information regarding the number of the authenticated wireless devices which are transmission sources of the wireless signals used as a bases for acquiring the position information, is acquired. On the basis of the acquired information regarding the number of the wireless devices, the position information acquired by the terminal device is authenticated.

6 Claims, 5 Drawing Sheets

(58) Field of Classification Search
CPC ... H04W 36/32; H04W 56/002; H04W 74/04; H04W 72/563
See application file for complete search history.

(56) References Cited

FOREIGN PATENT DOCUMENTS

| | | |
|---|---|---|
| CN | 110493719 A | 11/2019 |
| EP | 3 155 833 B1 | 1/2019 |
| JP | 2013-207720 A | 10/2013 |
| JP | 5839283 B2 | 1/2016 |
| JP | 6373905 B2 | 8/2018 |
| JP | 6425722 B2 | 11/2018 |
| KR | 10-2021-0108420 A | 9/2021 |
| WO | 2009/096184 A1 | 8/2009 |
| WO | 2014/167872 A1 | 10/2014 |
| WO | 2020/137971 A1 | 7/2020 |

OTHER PUBLICATIONS

Jun. 14, 2022 Written Opinion of the International Searching Authority issued in PCT/JP2022/020286.
Jun. 14, 2022 International Search Report issued in International Application No. PCT/JP2022/020286.
Jul. 22, 2024 Office Action issued in Chinese Patent Application No. 202280036278.7.
Dec. 18, 2024 Extended European Search Report issued in European Patent Application No. 22804616.5.

* cited by examiner

| Device Identifier | Area Identification Information | Flag Information (master or not) | RSSI | Data | ... |
|---|---|---|---|---|---|
| aaaa | 800 | ON | xxxx | yyyy | ... |
| bbbb | 801 | ON | pppp | rrrr | |
| ⋮ | ⋮ | ⋮ | ⋮ | ⋮ | ⋮ |
| | | | | | |

INDOOR POSITION AUTHENTICATION METHOD, INDOOR POSITION AUTHENTICATION SYSTEM, AND INDOOR POSITION AUTHENTICATION APPARATUS

TECHNICAL FIELD

The present disclosure relates to an indoor position authentication method, an indoor position authentication system, and an indoor position authentication apparatus, for authenticating indoor positions.

BACKGROUND ART

As prior arts, Patent Document 1 discloses a technology for authenticating a position by digital signature, in the locating technology using the Global Navigation Satellite System (GNSS). However, this technology according to Patent Document 1 cannot be applied for authenticating indoor positions where global navigation satellite signals cannot reach.

Patent Document 2 discloses a system for tracking a location of an individual, such as a child. According to this technology, signal transmitters and signal receivers dedicated to this system should be arranged in various places for location tracking, and thus, the cost for the equipment is large.

PRIOR ARTS

Patent Document

[Patent Document 1] Japanese Patent No. 6425722
[Patent Document 2] Japanese Patent No. 6373905

SUMMARY

Problems to be Solved

As mentioned above, according to the above prior arts, indoor position authentication has not been achieved. Further there are drawbacks that, for the purpose of position authentication, a system for acquiring an indoor position should be newly introduced, which leads to a large equipment cost.

The present disclosure has been made in view of the above, and one of the objectives of the present disclosure is to provide an indoor position authentication method, an indoor position authentication system, and an indoor position authentication apparatus, capable of performing indoor position authentication at a comparatively low equipment cost.

Solving Means

In order to solve the above drawbacks of the prior arts, one aspect of the present disclosure an indoor position authentication method which includes: authenticating a plurality of wireless device arranged indoors and transmitting wireless signals for position information acquisition; acquiring, from a terminal device which acquires position information on the basis of the wireless signals received from the authenticated wireless devices, information regarding the number of the authenticated wireless devices which are transmission sources of the wireless signals used as a basis for acquiring the position information; and authenticating the position information acquired by the position information on the basis of the acquired information regarding the number of the wireless devices.

Effect of the Disclosure

According to the present disclosure, an indoor position authentication system can be constituted by using an existing indoor apparatus capable of wireless communication, such as a wireless LAN system, etc., and indoor position authentication can be performed at a comparatively low equipment cost.

ASPECTS OF DISCLOSURE

Aspects of the present disclosure will be explained with reference to the drawings. As exemplified in FIG. 1, an indoor position authentication system 1 according to an aspect of the present disclosure is includes at least one wireless transmitter/receiver 100, an indoor position authentication apparatus 200 communicably connected to the wireless transmitter/receiver 100 through a network, etc., and a user device carried by a user, the user device being a target of position authentication. Further, the above-mentioned at least one wireless transmitter/receiver 100 is arranged indoors such as in a station yard, facilities such as a department store, and the like.

Figure 1:
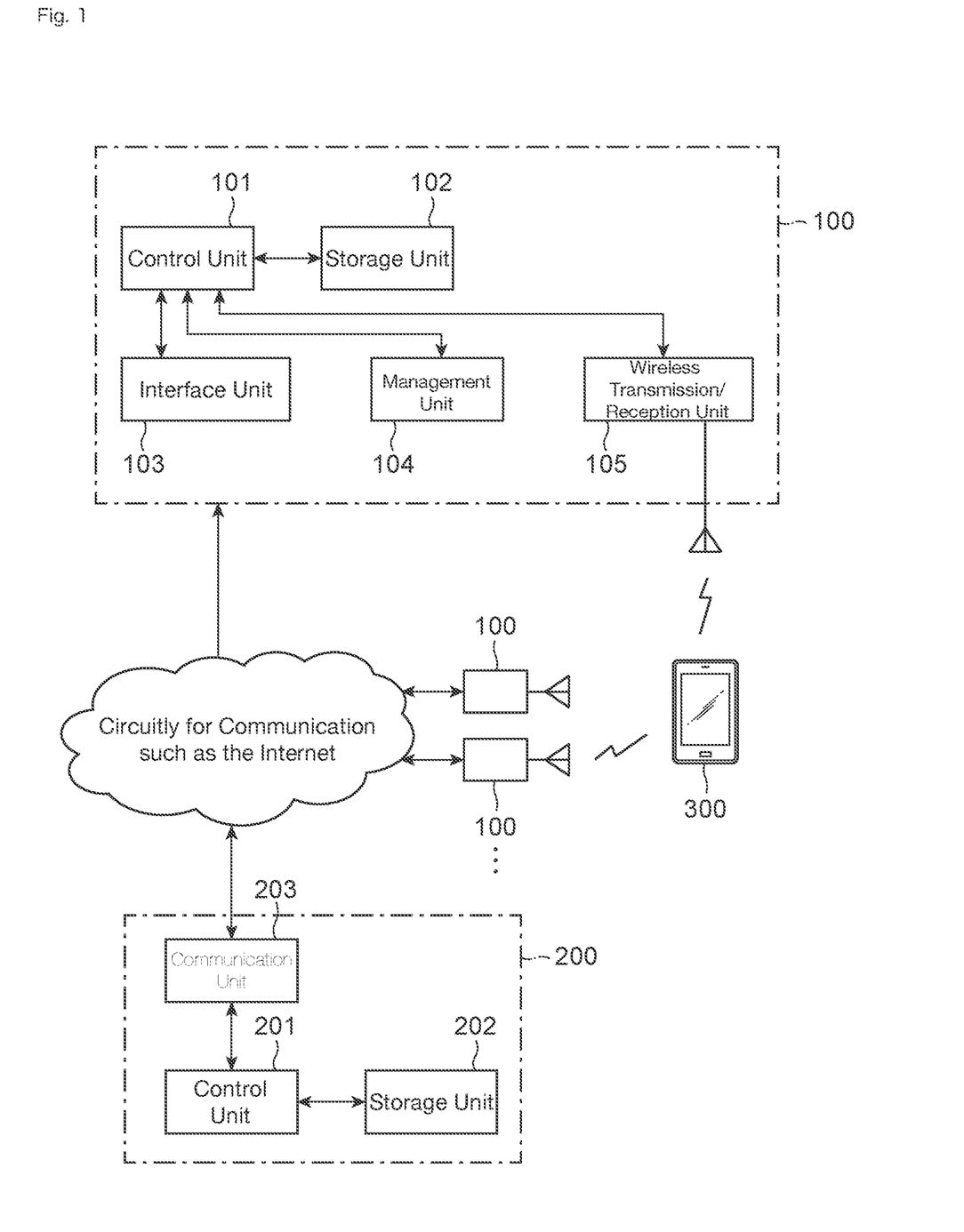
FIG. 1 is a block diagram illustrating a configuration example of an indoor position authentication system according to an aspect of the present disclosure.

The wireless transmitter/receiver 100 includes a control unit 101, a storage unit 102, an interface unit 103, a management unit 104, and a wireless transmission/reception unit 105.

The control unit 101 is a program-controlled device such as a CPU, and operates in accordance with a program stored in the storage unit 102. According to the present aspect, the control unit 101 of the wireless transmitter/receiver 100 executes a device authentication process and a position authentication process.

Specifically, the control unit 101 executes the device authentication process in accordance with instructions input from the indoor position authentication apparatus 200. Also, in accordance with the instructions input from the indoor position authentication apparatus 200, the control unit 101 controls establishment and disconnection of a communication path to the user device 300 located within a communicable area of the wireless transmission/reception unit 105 explained below. Performances of the control unit 101 will be explained in detail below.

The storage unit 102 stores a program to be executed by the control unit 101. The program may be provided by being stored in a computer readable and non-transitory storage medium and copied to and stored in the storage unit 102.

Further, the storage unit 102 also stores various parameters necessary for the processes by the control unit 101, and operates as a work memory of the control unit 101. By way of example, the storage unit 102 stores an individual database in which a device name (DeviceName), a device identifier (ID), identification information unique to a predetermined indoor area (area identification information: Area), an RSSI value, and other predetermined flag information and data, are mutually related.

Here, the area identification information recorded in the individual database has been previously set as unique information for each facility and for each area obtained by dividing the interior of the facility into a plurality of areas. Further, the RSSI value represents the strength of the signal transmitted from another device and received by the wireless transmitter/receiver 100 holding this individual database, the RSSI value being recorded in association with a device identifier identifying the transmission source device.

The interface unit 103 is an interface which receives information input by a user, examples thereof including a biometric authentication device such as a fingerprint authentication device, a touch sensor, a display, and the like.

The management unit 104 manages wireless signals transmitted or received by the wireless transmission/reception unit 105, in accordance with instructions input from the control unit 101.

The wireless transmission/reception unit 105 transmits and receives wireless signals from among GNSS signals, wireless LAN signals, Bluetooth (registered trademark) signals, mobile phone communication network signals (3G, 4G, 5G, etc.), and so on.

The indoor position authentication apparatus 200 is a computer controlled apparatus which transmits and receives various information to and from the wireless transmitter/receiver 100 through a network, and is provided at least with one or more program-controlled device such as a processor, and a storage device such as a disk device, memory device, etc. According to an example of the present aspect, the indoor position authentication apparatus 200 executes the device authentication process and the position authentication process by the operation of the one or more processor provided in the position authentication apparatus 200.

According to an example the present aspect, the wireless transmitter/receiver 100 can be a wireless LAN access point, a mobile phone communication base station, or various a various IoT device, arranged indoors.

The indoor position authentication apparatus 200 controls the plurality of wireless transmitter/receivers 100 arranged indoors. The indoor position authentication apparatus 200 communicates with a target wireless transmitter/receiver 100, authenticates its position, and controls its communication.

As exemplified in FIG. 1, the indoor position authentication apparatus 200 includes a control unit 201, a storage unit 202, and a communication unit 203.

The control unit 201 is a program-controlled device such as a CPU, etc., and operates in accordance with a program stored in the storage unit 202. The control unit 201 corresponds to the one or more processor of the present disclosure. The control unit 201 of the present aspect executes a device authentication process and a position authentication process. The operations of the control unit 201 will be explained in detail below.

The storage unit 202 stores a program to be executed by the control unit 201. The program may be provided by being stored in a computer readable and non-transitory storage medium and copied to and stored in the storage unit 202.

Figure 2:
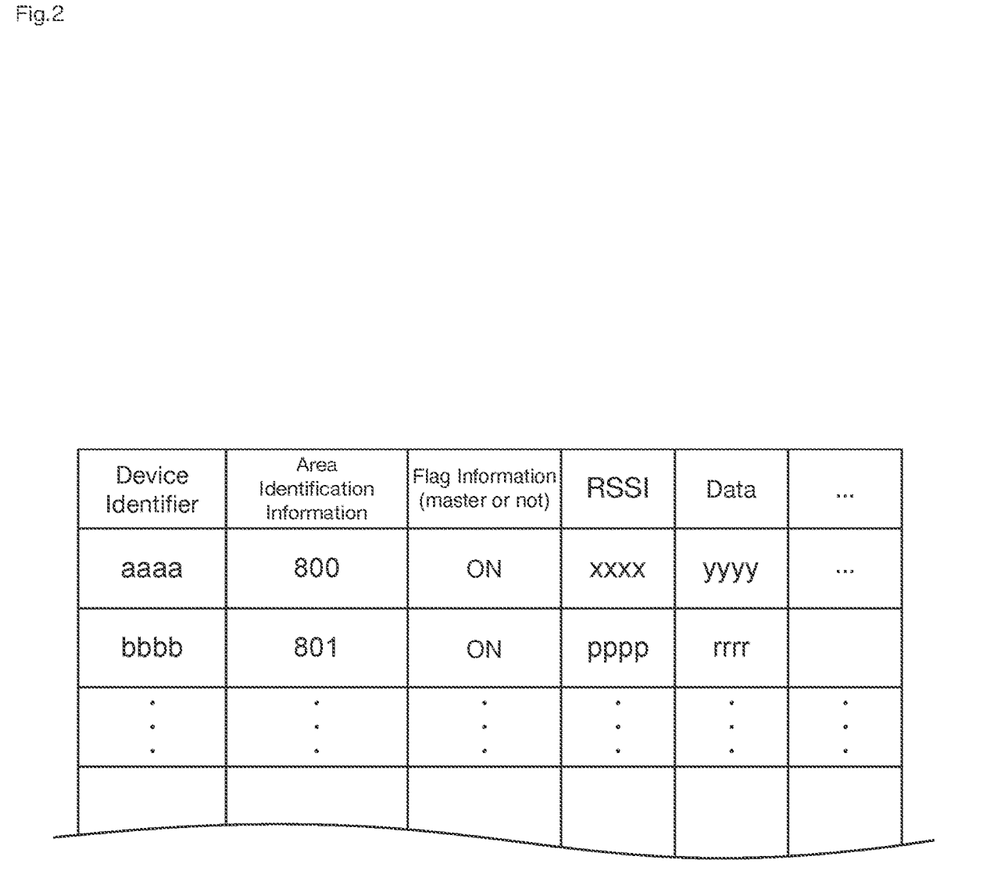
FIG. 2 is an explanatory view illustrating a content example of a database used by an indoor position authentication apparatus according to an aspect of the present disclosure.

Further, as exemplified in FIG. 2, the storage unit 202 holds a device database in which at least information for identifying the wireless transmitter/receiver 100 communicating with the indoor position authentication apparatus 200 (which can be any information such as name, device identifier, network address, as far as the information is unique to the wireless transmitter/receiver 100), identification information unique to the indoor area in which the wireless transmitter/receiver 100 is arranged (area identification information), and information whether or not the wireless transmitter/receiver 100 is authenticated (whether or not "being a master") are mutually related. Further, in this database, various data (Data), and in case of a wireless transmitter/receiver 100 fixed at the arranged position, information specifying the arranged position in the area (information specifying a store where the wireless transmitter/receiver 100 is arranged), and the like, can be further related.

The communication unit 203 is a network interface, etc., which transmits and receives information to and from each wireless transmitter/receiver 100, in accordance with instructions input from the control unit 201.

The user device 300 is a mobile phone terminal, etc., which is carried by a user, and which can be moved.

[Device Authentication Process]

Next, the device authentication process executed by the control unit 101 of the wireless transmitter/receiver 100 and the control unit 201 of the indoor position authentication apparatus 200 will be explained. According to an example of the present aspect, integrity authentication regarding positions of n or more wireless transmitter/receivers 100 (n being an integer of 2 or more) arranged indoors such as in a facility, etc., is performed on the basis of whether or not the wireless transmitter/receivers 100 can mutually communicate with each other. For example, when three wireless transmitter/receiver 100 can mutually communicate with each other, these wireless transmitter/receivers 100 are authenticated as being arranged in the same indoor place.

Therefore, in the present aspect, the control unit 101 of the wireless transmitter/receiver 100 and the control unit 201 of the indoor position authentication apparatus 200 repeat the below-mentioned device authentication process, at a predetermined time.

Figure 3:
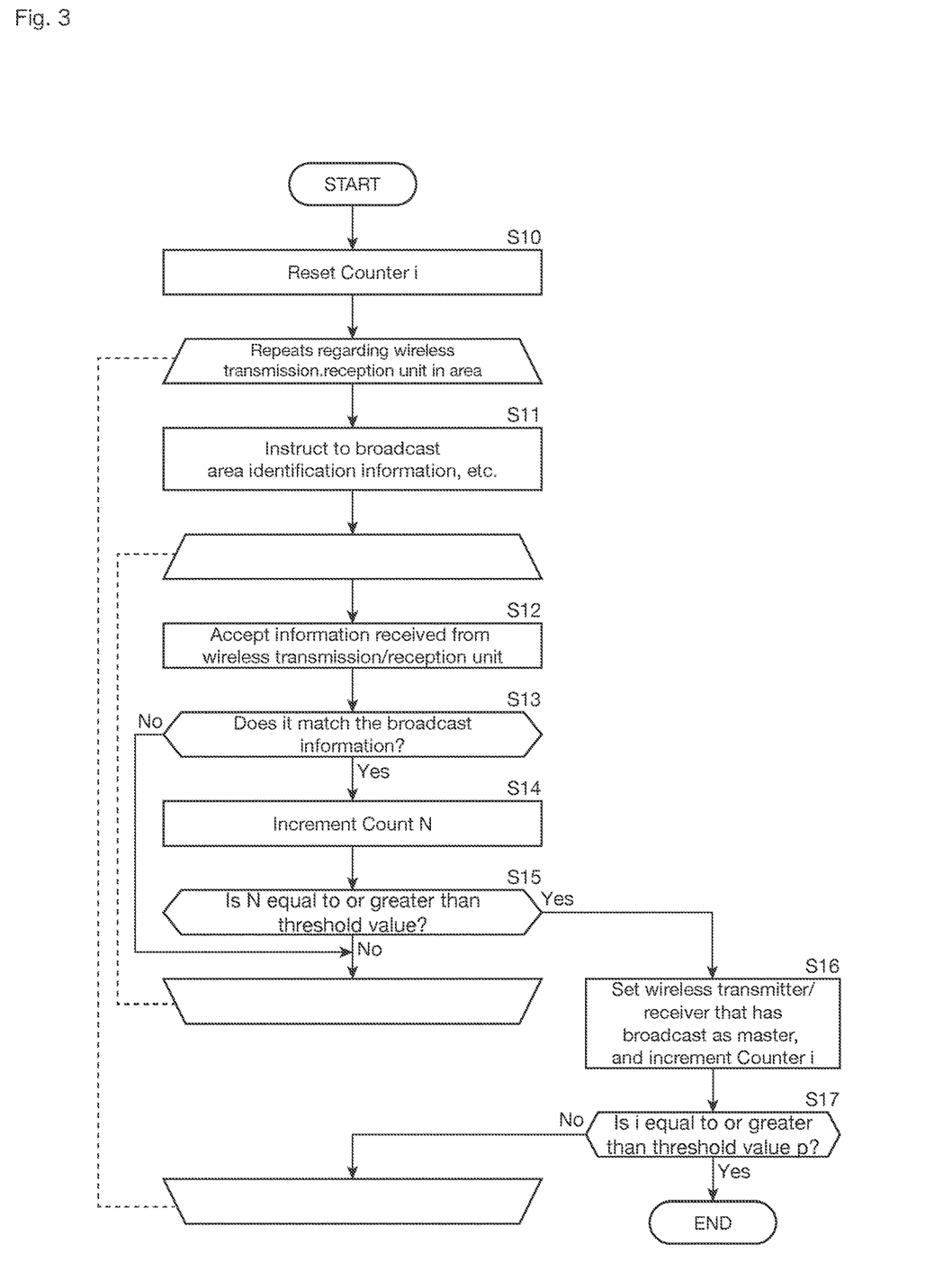
FIG. 3 is a flowchart showing a performance example of an indoor position authentication apparatus according to an aspect of the present disclosure.

Namely, as exemplified in FIG. 3, the control unit 201 of the indoor position authentication apparatus 200 resets a counter i to "0" (S10), and repeats the subsequent processes while sequentially selecting each wireless transmitter/receiver 100 specified by the information stored in the database of the storage unit 202 の database.

The control unit 201 resets a counter N to "0". The control unit 201 transmits information identifying a selected wireless transmitter/receiver 100 (hereinbelow, referred to as a noted wireless transmitter/receiver), and various information including area identification information, associated with this information, to the noted wireless transmitter/receiver. Here, the various information including the area identification information can include flag information indicating whether "being a master" or not. Thereby, the control unit 201 instructs the noted wireless transmitter/receiver 100 to broadcast the relevant information (instruct to broadcast: S11). The broadcasting of the wireless signals from the wireless transmission/reception unit 105 can be performed in different ways depending on whether the wireless transmitter/receiver 100 is a wireless LAN access point, a mobile phone communication base station, and the like.

Here, the control unit 201 can temporarily set the flag information, which is stored in the device database corresponding to the noted wireless transmitter/receiver, to "OFF" (information representing "not being Master").

Information broadcast from the noted wireless transmitter/receiver is received by a wireless transmitter/receiver 100 other than the noted wireless transmitter/receiver, and the control unit 201 accepts the relevant information from the wireless transmitter/receiver 100 other than the noted wireless transmitter/receiver (S12). As explained below, the wireless transmitter/receiver 100 other than the noted wireless transmitter/receiver which has received the information broadcast by the noted wireless transmitter/receiver also transmits RSSI information representing the strength of the signal received from the noted wireless transmitter/receiver, together with the received information, to the indoor position authentication apparatus 20.

Then, the control unit 201 compares the received information with the information transmitted at Step S11 (S13) Specifically, the control unit 201 examines whether the area identification information contained in the information transmitted at Step S11 matches the area identification information contained in the information received in Step S12 area identification information. When they are matched, the counter N is incremented by "1" (S14), and whether or not the counter N becomes equal to or greater than a predetermined threshold value n, n being an integer of 2 or more (for example, n=2) is determined (S15).

In Step S15, if the counter N is equal to or greater than the threshold value n of the predetermined integer, the control unit 201 updates the device database by rewriting the flag information to "ON" (information representing "being a master"), the flag information being associated with the information identifying the noted wireless transmitter/receiver, among the information stored in the device database, and increments the counter i by "1" (S16).

Thereafter, the control unit 201 examines whether or not the value of the counter i is equal to or greater than the threshold value P, which is determined in advance as the number of wireless transmitter/receiver to be authenticated (S17). Hereinbelow, the threshold value P is referred to as a device authentication threshold value. According to an example of the present aspect, the device authentication threshold value P is determined as, for example, an integer of 3 or more. In Step S17, if the value of the counter i is equal to or greater than the device authentication threshold value P, the control unit 201 terminates the process.

On the other hand, in Step S17, if the value of the counter i is less than the device authentication threshold value, the control unit 201 selects the next wireless transmitter/receiver 100 as a noted wireless transmitter/receiver, and continues the process by returning to Step S11.

Further, in Step S15, if the counter N is less than the threshold value n of the predetermined integer, the control unit 201 returns to Step S12, and stands by for receiving information from another different wireless transmitter/receiver 100.

In addition, if the standby time exceeds a predetermined time period in Step 12, or, in Step 13, if the area identification information contained in the information transmitted in Step S11 does not match the area identification information contained in the information accepted in Step 12, the control unit 201 terminates the repeated process of Step S12 to Step 14, selects the next wireless transmitter/receiver 100 as a noted wireless transmitter/receiver, and continues the process by returning to Step S11.

When every one of the wireless transmitter/receivers 100 registered in the device database is sequentially selected as a noted wireless transmitter/receiver, and Step S11 to S17 of the process is performed, the control unit 201 terminates the process.

Further, when the indoor position authentication apparatus 200 controls wireless transmitter/receivers 100 in a plurality of areas which are identified by mutually different area identification information, the indoor position authentication apparatus 200 executes the above process for the wireless transmitter/receiver 100 in each of the areas.

On the other hand, from among the area identification information broadcast from other mutually different plurality of wireless transmitter/receivers 100 and received by the wireless transmitter/receiver 100 operating together with the indoor position authentication apparatus 200, the control unit 101 of the relevant the wireless transmitter/receiver 100 selects the area identification information so that the number of pieces of the selected area identification information is the largest, and stores the selected area identification information in the storage unit 102 as area identification information of the area where the relevant wireless transmitter/receiver 100 itself is located. Further, as exemplified in FIG. 4, the control unit 101 receives the area identification information, etc., from the indoor position authentication apparatus 200 (S21), and then, compares the area identification information contained in the received information with the area identification information stored in the storage unit 102 of itself (S22). If they do not match, there is a possibility that the wireless transmitter/receiver 100 has been improperly moved, and thus, the indoor position authentication apparatus 200 suspends the subsequent process.

Figure 4:
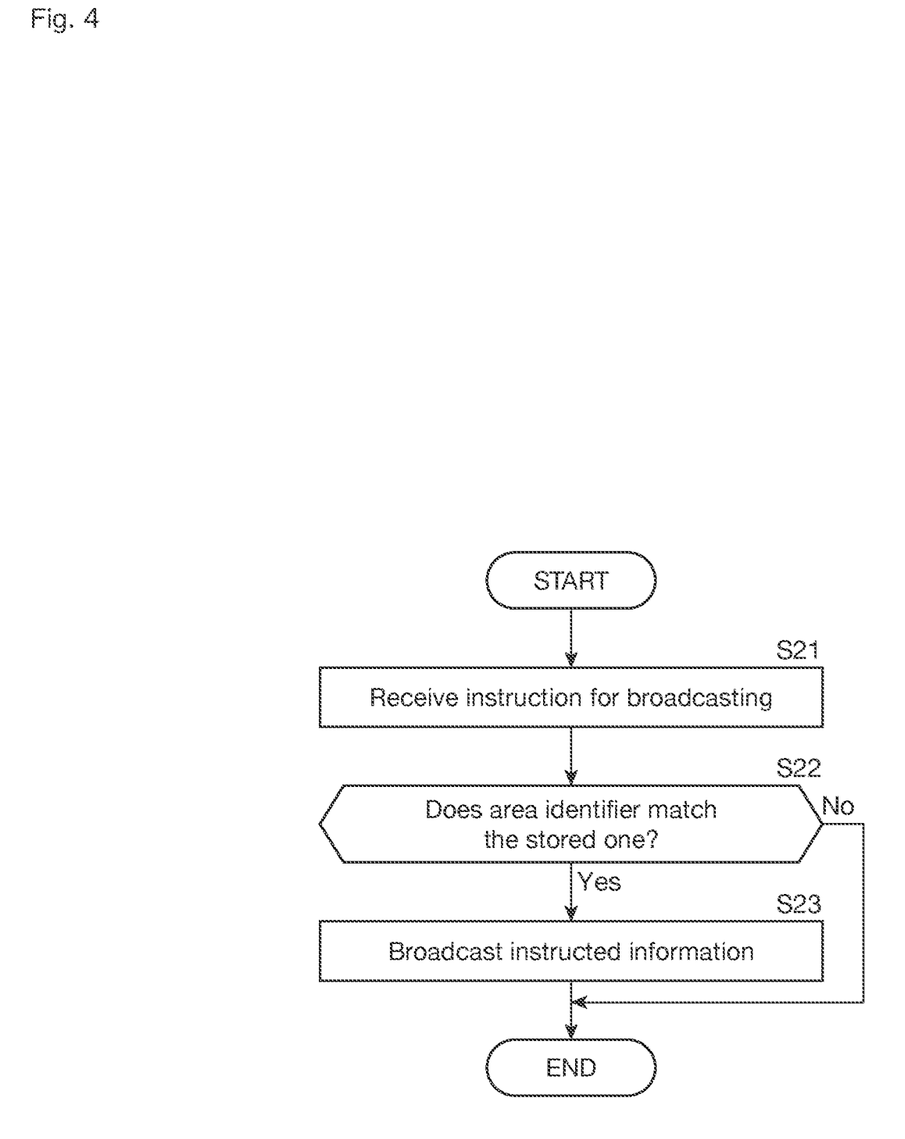
FIG. 4 is a flowchart showing a performance example of a wireless transmitter/receiver communicating with an indoor position authentication apparatus according to one aspect of the present disclosure.

On the other hand, in Step S22, if the area identification information contained in the received information matches the area identification information stored in the storage unit 102 of itself, the information received in Step S21 is wirelessly broadcast therearound (S23).

Further, when the control unit 101 of the wireless transmitter/receiver 100 receives information broadcast from other wireless transmitter/receiver 100, the control unit 101 transmits the received information and information regarding the strength of the wireless signal when the relevant information is received, to a predetermined indoor position authentication apparatus 200.

By these operations, the indoor position authentication apparatus 200 finds out at least P wireless transmitter/receivers 100 (P being an integer of 3 or more) per area from the wireless transmitter/receivers 100 located in areas registered in advance, and records them as authenticated wireless transmitter/receivers 100 (master transmitter/receivers).

[Temporal Change in Device Authentication Status]

The wireless transmitter/receiver 100 treated as a master transmitter/receiver is not permanently treated as a master transmitter/receiver. For example, in case that a wireless transmitter/receiver 100 is provided in a store, the power source of the wireless transmitter/receiver 100 may be turned off when the store is closed.

As mentioned above, according to the present aspect, the device authentication process for a wireless transmitter/receiver 100 is repeatedly performed at a predetermined time interval (for example, every 10 minutes, etc.), and so that the master transmitter/receiver 100 can be kept as many as possible, leading to improving the availability of the system according to the present aspect.

For example, assuming that, in an area where four wireless transmitter/receivers 100a, 100b, 100c, 100d are present, three wireless transmitter/receivers 100a, 100b, 100c are recorded as master transmitter/receivers. Under these circumstances, if the wireless transmitter/receiver 100a becomes unable to communicate for some reason, at the time of the next device authentication process, the wireless transmitter/receiver 100a does not respond to the broadcast instruction transmitted from the indoor position authentication apparatus 200 (Step S11 in FIG. 3), whereas other wireless transmitter/receivers 100b, 100c, 100d respond to the instruction, and sequentially broadcast information containing area identification information which identifies the area where these wireless transmitter/receivers 100 are located.

Thus, in this example, the information broadcast by the wireless transmitter/receiver 100b is received by the wireless transmitter/receivers 100c, 100d, and thus, the wireless transmitter/receivers 100c, 100d respectively transmit the received information to the indoor position authentication apparatus 200. The indoor position authentication apparatus 200 refers to the information received by the wireless transmitter/receivers 100c, 100d, and confirms that the information matches the information broadcast from the wireless transmitter/receiver 100b. On the basis of the fact that the information broadcast from the wireless transmitter/receiver 100b is received by two or more other wireless transmitter/receivers 100c, 100d (wireless transmitter/receivers other than the wireless transmitter/receiver 100b), the wireless transmitter/receiver 100b is recorded as an authentication master transmitter/receiver.

Similarly, the information broadcast from the wireless transmitter/receiver 100c is received by the wireless transmitter/receivers 100b, 100d, and the information broadcast from the wireless transmitter/receiver 100d is received by the wireless transmitter/receivers 100b, 100c. Therefore, the indoor position authentication apparatus 200 records the three wireless transmitter/receivers 100a, 100b, 100c as master transmitter/receivers.

Accordingly, the indoor position authentication apparatus 200 maintains the availability of the position authentication process (which will be explained below) in the area where the wireless transmitter/receivers 100a, 100b, 100c, 100d are located.

[Position Authentication Process]

Next, a position authentication process of a user device 300 carried by a user, will be explained. According to the present aspect, the user device 300 executes an application program for the position authentication process, and receives information such as area identification information, flag information indicating whether or not "being a master", and so on, which is broadcast from the wireless transmitter/receiver 100, during the device authentication process, etc., in response to the instruction from the indoor position authentication apparatus 200.

The user device 300 accumulates and holds the received information. Specifically, the user device 300 is a smartphone, etc., which receives a broadcast signal, demodulates the received signal, and retrieves the broadcast information. Then, the user device 300 accumulates and records the retrieved information (received information), using the information identifying the wireless transmitter/receiver 100 as a key. At this time, the user device 300 may also records, in association with information identifying the wireless transmitter/receiver 100 which is a transmission source of the broadcast information, the signal reception strength (RSSI value) of the received signal broadcast from the relevant wireless transmitter/receiver 10.

The user device 300 assumes that the area identification information contained in the last received information is information identifying the area where the user device itself is currently located (locating area information), and retrieves, from the recorded information, information which contains area identification information corresponding to the above locating area information, and is associated with the information identifying the mutually different wireless transmitter/receiver 100.

The user device 300 refers to flag information representing whether or not "being a master" contained in the retrieved information, and counts the number N representing the number of pieces of information (referred to as certification information) associated with information identifying the mutually different wireless transmitter/receiver 100 and containing flag information representing the state of "being a master".

If the number N is less than a predetermined threshold value (wherein, the threshold value is equal to or greater than the device authentication threshold value, and when a specific numerical value is required for explanation, N=3), the user device 300 repeats the processes from the process of receiving information broadcast from the wireless transmitter/receiver 100.

If the number N is more than the threshold value, the user device 300 records at least a part of the certification information (for example, a set of information identifying the N wireless transmitter/receivers 100, or a set of RSSI values recorded in association with the information identifying the N wireless transmitter/receivers). The record is information indicating that the user device 300 is located in the area indicated by the locating area information. Further, the user device 300 determines that it is located in an area identified by the area identification information contained in the certification information (acs position information).

In addition, the user device 300 may transmit the recorded information (a set of information identifying N wireless transmitter/receivers 100, or a set of the identification information and the RSSI value recorded in association therewith), together with the information identifying the user device 300, to an external server such as the indoor position authentication apparatus 200, etc., so as to be recorded therein. The external server which receives the information records the information identifying the user device 300 (for example, telephone number of the user device 300, etc.) in association with at least a part of the certification information (for example a set of information identifying the N wireless transmitter/receivers 100).

As an example, when the user device 300 transmits a set of the information identifying the N wireless transmitter/receivers 100 and the RSSI values recorded in association with the identification information, to the indoor position authentication apparatus 200, the indoor position authentication apparatus 200 may operate as follows.

Namely, it is provided that the indoor position authentication apparatus 200 in this example holds, in its device database, information regarding arranged position of each wireless transmitter/receiver 100 in the area. On the basis of the information received from the user device 300, the indoor position authentication apparatus 200 estimates approximate distance of the user device 300, i.e., the transmission source of the information, from each wireless transmitter/receiver 100 identified by the identification information contained in the relevant information, using the corresponding RSSI value, and estimates the position of the user device 300 in the area.

[Pseudorandom Information]

Further, according to an example of the present aspect, the indoor position authentication apparatus 200 can include pseudorandom value information in the instruction broadcast to the wireless transmitter/receiver 100, together with the information identifying the wireless transmitter/receiver 100, etc., as information to be broadcast. The pseudorandom value may be the one determined by certain random numbers, or may be time information encrypted by a predetermined private key (time information acquired by the indoor position authentication apparatus 200), and the like.

Then, the wireless transmitter/receiver 100 broadcasts the pseudorandom value together with the area identification information, the flag information indicating whether or not "being a master", and the like.

The indoor position authentication apparatus 200 stores and records the pseudorandom value in association with the information identifying the wireless transmitter/receiver 100 which instructs the broadcast.

The user device 300, etc., also receives the pseudorandom value broadcast by the wireless transmitter/receiver 100, and includes the pseudorandom value included in the certification information, in the information to be recorded. In this example, when the locating position of the user device 300 is to be authenticated later, whether or not the recorded information matches the pseudorandom value made by the indoor position authentication apparatus 200 at the corresponding time is confirmed, to thereby improve the reliability of the recorded information.

[Operation]

The indoor position authentication system 1 according to an example of the present aspect is basically provided with the above-mentioned structures, and operates as follows.

In the below-mentioned examples, position authentication is to be performed in an indoor area, and a plurality of wireless transmitter/receivers 100 capable of wirelessly transmitting/receiving information are arranged in the area. Further, the wireless transmitter/receivers 100 are connected to be communicable with the indoor position authentication apparatus 200.

The indoor position authentication apparatus 200 holds a database, in advance, regarding the wireless transmitter/receivers 100 corresponding in each area, the database containing at least information identifying the wireless transmitter/receivers 100, area identification information unique to the area in which the wireless transmitter/receivers 100 are arranged, and flag information representing whether or not the wireless transmitter/receiver 100 is in the authenticated state (whether or not "being a master"), which are associated with each other.

Under these conditions, the indoor position authentication apparatus 200 repeats the device authentication process regarding the wireless transmitter/receivers 100, at a predetermined time interval. In this process, for each area, each of the wireless transmitter/receivers 100 specified by the information stored in the database are sequentially selected, and the following processes are repeated.

The selected wireless transmitter/receiver 100 is referred to as a noted wireless transmitter/receiver, and the indoor position authentication apparatus 200 transmits information identifying the noted wireless transmitter/receiver, as well as information associated therewith, such as, area identification information, flag information indicating whether or not "being a master", and the like, as a broadcast instruction, to the noted wireless transmitter/receiver. At this time, the indoor position authentication apparatus 200 sets the flag information of the wireless transmitter/receiver 100 in the database to OFF ("not being a master").

Upon receiving the broadcast instruction from the indoor position authentication apparatus 200, the noted wireless transmitter/receiver compares the area identification information contained in the instruction with the area identification information stored in the storage unit 102 of its own. If they match, in accordance with the instruction, the noted wireless transmitter/receiver transmits, i.e., broadcasts the received information identifying the noted wireless transmitter/receiver, area identification information, flag information indicating whether or not "being a master", and the like. Here, the method for the broadcast may be different depending on the communication method of the wireless transmitter/receiver 100. However, any communication methods can be used as far as a device having a receiving ability corresponding to the communication method can receive any signals without specific destination thereof.

When other wireless transmitter/receivers 100 (for the sake of convenience, referred to as reception side devices) different from the noted wireless transmitter/receiver, but arranged in the area same as the area where the noted wireless transmitter/receiver is arranged, receive the information broadcast from the noted wireless transmitter/receiver, the reception side devices transmit the received information and information regarding the strength of the wireless signal when the information is received, to a predetermined indoor position authentication apparatus 200.

Every time that the indoor position authentication apparatus 200 accepts, from the reception side devices, the information that the reception side devices have received from the noted wireless transmitter/receiver, and the signal strength information thereof, the indoor position authentication apparatus 200 compares the information accepted from the reception side devices as the information received from the noted wireless transmitter/receiver, with the information transmitted to the noted wireless transmitter/receiver in advance. If they match, the number of the reception side devices is counted. When the count value N becomes equal to or greater than the threshold value n (for example, n=2), the flag information, in the database, associated with the information identifying the noted wireless transmitter/receiver is set to ON.

By these processes, if the wireless transmitter/receiver 100 arranged in an area is determined as mutually communicable with more than a predetermined number of other wireless transmitter/receivers 100, the wireless transmitter/receiver 100 is registered as a master, and becomes an authenticated state.

Regarding each area, the indoor position authentication apparatus 200 periodically repeats the above processes so that the number of wireless transmitter/receivers 100 registered as master does not become less than a predetermined number (for example, three).

Further, a user device 300 located in the area where these wireless transmitter/receivers 100 are arranged, receives information such as the area identification information, the flag information indicating whether or not "being a master", etc., which is broadcast from the wireless transmitter/receiver 100 during the device authentication process in response to the instruction from the indoor position authentication apparatus 200.

The user device 300 accumulates and stores the received information, with the information identifying the wireless transmitter/receiver 100 as a key.

Further, the user device 300 assumes that the area identification information contained in the last-received information is the information identifying the area where the user device itself is currently located. Then, the user device 300 retrieves information, from the accumulated information, so that the retrieved information contains area identification information which matches the locating area information, and is associated with information identifying mutually different wireless transmitter/receivers 100.

Then, the user device 300 refers to the flag information indicating whether or not "being a master" contained in the retrieved information, and counts the number N of pieces of certification information which are associated with information identifying mutually different wireless transmitter/receivers 100 and have flag information indicating a state of being a master.

If the number N is less than a predetermined threshold value (threshold value is three or more, and in the explanation herein, the threshold value is three), the user device 300 repeats the processes from the process of receiving the information broadcast from the wireless transmitter/receiver 100.

Further, if the number N is equal to or greater than the threshold value, the user device 300 records at least a part of the certification information (for example, a set of information identifying the N wireless transmitter/receivers 100). The record can be used as information indicating that the user device 300 is located in the area indicated by the locating area information, in later days, for example.

[Effect of Aspect]

According to the present aspect, by using an existing indoor system, such as a wireless LAN system, and updating software of access points in the system, a position authentication system can be configured, and an indoor position of a user device etc., can be authenticated at a comparatively low installing cost.

[Example of Authenticating Position of NFC Card, Etc.]

Figure 5:
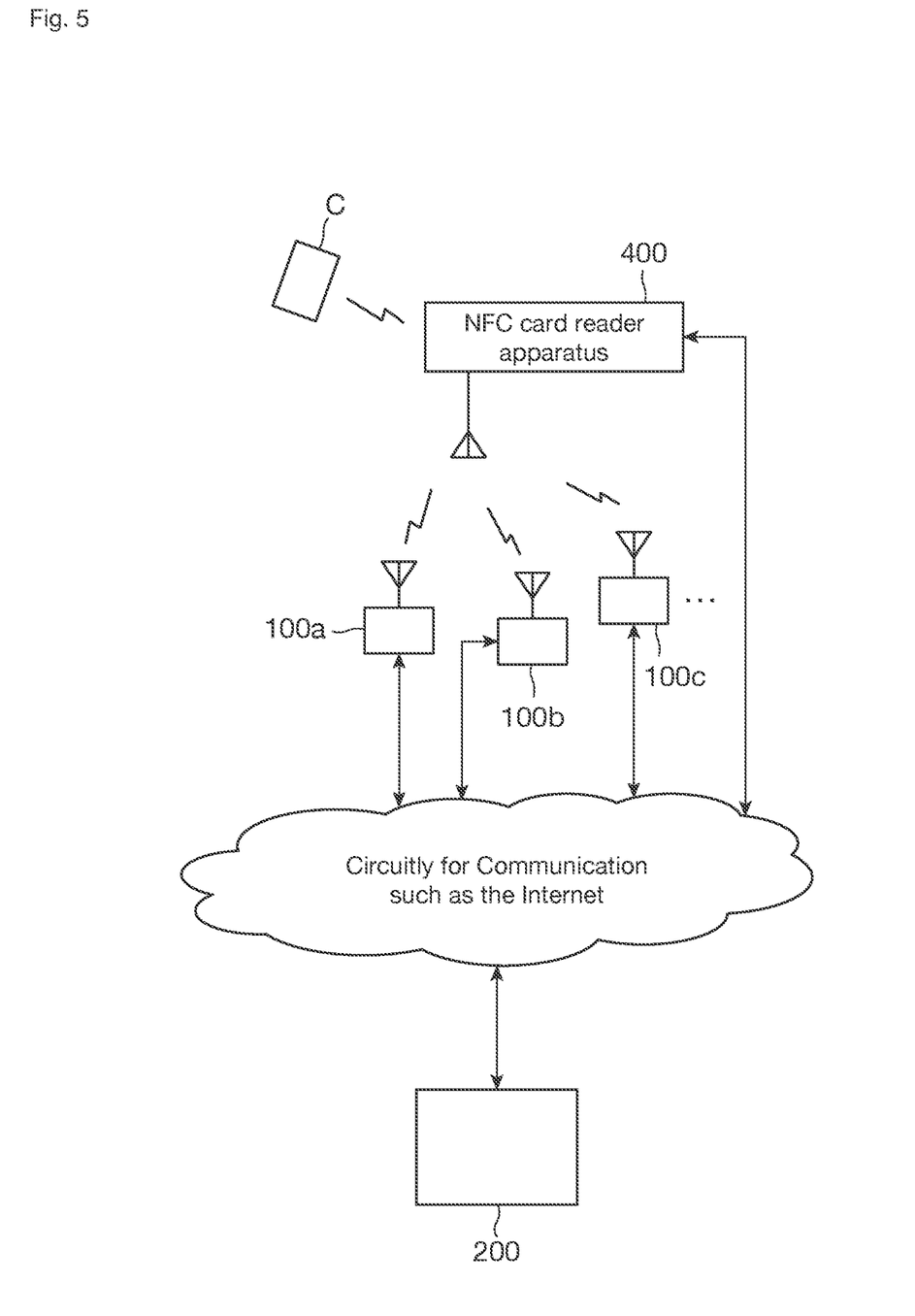
FIG. 5 is a block diagram showing another configuration example of an indoor position authentication system according to an aspect of the present disclosure.

As exemplified in FIG. 5, the indoor position authentication system 1 according to the present aspect can be used for authenticating a position of a near field communication card.

According to the example shown in FIG. 5, an NFC card reader apparatus 400 which reads information of an NFC card C, is arranged in an area where the NFC card reader apparatus 400 can communicate with the wireless transmitter/receiver 100. For each NFC card reader apparatus 400, a unique reader identifier is set in advance. The NFC card reader apparatus 400 may be, for example, an automatic ticket gate installed at a train station.

Further, according to the present example, the indoor position authentication apparatus 200 has a device database which holds information relating to the wireless transmitter/receiver 100, and in addition, has a reader database in which, regarding the NFC card reader apparatus 400, the reader identifier is recorded in association with the area identification information of the area where the NFC card reader apparatus 400 identified by the reader identifier is installed, and has a card database which records information identifying the area where each NFC card is located.

By the process similar to the above-mentioned position authentication process of the user device 300, the NFC card reader apparatus 400 acquires area identification information of the area where the NFC card reader apparatus 400 itself is located. The NFC card reader apparatus 400 transmits a reader identifier identifying the NFC card reader apparatus 400, and the acquired area identification information, to the indoor position authentication apparatus 200, which are associated with each other and recoded in the reader database.

Further, after the NFC card reader apparatus 400 reads identification information NFC card C touched thereon (card identification information), the NFC card reader apparatus 400 transmits the reader identifier identifying the NFC card reader apparatus 400 itself, and the card identification information that has been read, to the indoor position authentication apparatus 200.

When the indoor position authentication apparatus 200 receives, from the NFC card reader apparatus 400, the reader identifier identifying the NFC card reader apparatus 400 itself, and the card identification information read by the NFC card reader apparatus 400, the indoor position authentication apparatus 200 refers to the reader database, and acquires the area identification information associated with the relevant NFC card reader apparatus 400.

Further, the indoor position authentication apparatus 200 stores, in the card database, the card identification information in association with the acquired area identification information, and flag (flag representing OFF) information indicating that locating in the area identified by this area identification information is not authenticated.

Then, the indoor position authentication apparatus 200 retrieves, from the device database, information which identifies a wireless transmitter/receiver 100 associated with the above-acquired area identification information, and which identifies a wireless transmitter/receiver 100 with the flag information "ON" (indicating the authenticated state). The indoor position authentication apparatus 200 examines whether or not the number of pieces of the information identifying the wireless transmitter/receivers 100 retrieved through the search is equal to or greater than the redetermined threshold value (for example, "3"). Here, if the number of pieces of the information identifying the wireless transmitter/receivers 100 that has been retrieved from the search is equal to the predetermined threshold value, the indoor position authentication apparatus 200 overwrites and updates the information relating to the card identification information received from the NFC card reader apparatus 400 and recorded in the card database in advance, by changing the flag information indicating whether or not being authenticated to ON (representing the state of being authenticated).

Namely, according to the present aspect, regarding the NFC card C which is passed over the NFC card reader apparatus 400, the information of its locating area is set to the (authenticated) area identification information of the area where the NFC card reader apparatus 400 is located. Further, at the time that the NFC card C is passed over, under the conditions that, in the area identified by the relevant area identification information, the number of master wireless transmitter/receivers 100 (the location positions of which are authenticated) for authenticating the locating area of the NFC card reader apparatus 400 is equal to or greater than, for example, three, the area where the NFC card reader 400 is located is authenticated, and the NFC card C read by the NFC card reader 400 is authenticated as being locate in the area where the NFC card reader 400 is located.

Here, the NFC card reader apparatus 400 is an automatic ticket gate apparatus, but the NFC card reader apparatus 400 does not have to be an automatic ticket gate apparatus and can be, for example, a vending machine.

[Database History]

In the indoor position authentication system 1 according to the present aspect, the indoor position authentication apparatus 200 may hold histories of updates (commitments) regarding various databases such as a device database, a reader database, a card database, and the like. The history may be provided to a process for estimating a moving path of a user device 300, etc., and a process for charging based on the moving path.

The indoor position authentication system 1 of this example, provided with the indoor position authentication apparatus 200, can be used for, for example, a ticket gate system of a railway, etc. Specifically, in this example, a database (position information converting database) in which area identification information to be used in the present aspect and information representing the position of a ticket gate to be used in the ticket gate system are associated with each other, is prepared in advance.

In one example, position information converting database is set as follows.

Area Identification Information: Information Specifying Ticket Gate, etc.
    800: JR EAST_Tohoku Shinkansen_Tokyo Station Ticket Gate
    801: JR EAST_Tohoku Shinkansen_Tokyo Station Shinkansen Platform
    802: JR EAST_Tohoku Shinkansen_Omiya Station Ticket Gate
    . . .

In this example, when a user of the indoor position authentication system 1 according to the present aspect, who carries the user device 300 (identification information thereof being "300") moves closer to the Shinkansen ticket gate at Tokyo station, the device identification information, the area identification information, the authentication, and . . . , are recorded as follows.

Device Identification Information: Area Identification Information: Authentication: . . . ,
    100a: 800: ON: . . .
    100b: 800: ON: . . .
    100c: 800: ON: . . .
    300: 800: ON: . . .
    101a: 801: ON: . . .
    . . .

Here, for convenience in description, the items, i.e., the device identification information, the area identification information, the authentication, . . . are separated by colons. Further, the initial line represents names of the items.

At this time, the indoor position authentication apparatus 200 stores the following record, as a record that the database update has been established.

Device Identification Information: Area Identification Information: Authentication: . . .
    300: 800: ON . . .

This record represents the state that the user device 300 is located in the area with the area identifier "800" in which three authenticated (master) wireless transmitter/receivers 100 are located, is authenticated.

Further, when the user moves to the Shinkansen platform, the record in the database is updated and established as follows.

Device Identification Information: Area Identification Information: Authentication: . . .
    . . .
    100c: 800: ON: . . .
    300: 801: ON: . . .
    101a: 801: ON: . . .
    . . .

At this time, the record of the established update regarding the user device 300 is changed as follows.

Device Identification Information: Area Identification Information: Authentication: . . .
    300: 800: ON . . .
    300: 801: ON . . .

Next, when the user arrives at Sendai station (wherein, area identification information of the ticket gate is 805, area identification information of the platform is 806), and gets off the Shinkansen, the indoor position authentication apparatus 200 updates the database so that the record in the database is updated and established as follows.

Device Identification Information: Area Identification Information: Authentication: . . .
    . . .
    100x: 806: ON: . . .
    300: 806: ON: . . .
    . . .

At this time, the record of the established update regarding the user device 300 is changed as follows.

Device Identification Information: Area Identification Information: Authentication: . . .
    300: 800: ON . . .
    300: 801: ON . . .
    300: 806: ON . . .

Thereafter, when the user passes through the ticket gate at Sendai station, the fact of locating near this ticket gate is authenticated, and the database is updated by the indoor position authentication apparatus 200 as follows.

. . .
    100y: 805: ON: . . .
    300: 805: ON: . . .
    . . .

Then, the record of the established update regarding the user device 300 is changed as follows.

Device Identification Information: Area Identification Information: Authentication: . . .
    300: 800: ON . . .
    300: 801: ON . . .
    300: 806: ON . . .
    300: 805: ON . . .

Accordingly, the movement of the user, that is, Tokyo station ticket gate→Tokyo station Shinkansen platform→Sendai station Shinkansen platform→Sendai station ticket gate, etc., is authenticated.

Regarding the record in the established update history, if the area identification information is converted to the position information of the ticket gate system, with reference to the position information converting database, it is authenticated that the user enters from the Tokyo station Shinkansen ticket gate and exits from the Sendai station ticket gate. Thus, the railway company, etc., can use the information for charging process, and the like.

Namely, according to the present aspect, calculating and requesting fares becomes possible, without using a system provided with an automatic door opening apparatus, etc., a NFC card reader apparatus, etc., as a ticket gate. Further, since it is apparent that this system is used, providing users an incentive to use this system is possible by discounting the fare only when this system is used.

In addition, as mentioned above, in the present aspect, the user device 300 can be a mobile phone, such as a conventionally popular smartphone, etc. Namely, in order to use the indoor position authentication system according to the present disclosure, it is only required that the user device 300 has a certain wireless communication function. No other infrastructure development is required.

[Modified Example]

In the above explanation, the threshold value, for position authentication, regarding the number of wireless transmitter/receivers 100 which are mutually communicable and located in an area identified by the same area identifier can be set regardless of the wireless communication method of the wireless transmitter/receivers 100. However, the present aspect is not limited thereto.

For example, if the wireless transmitter/receiver 100 is a mobile phone communication base station, it is assumed that a fraud movement is difficult. Thus, in this case, the threshold value can be smaller than the case using a wireless LAN access point where fraud movement is easier.

EXPLANATION ON NUMERALS 1 indoor position authentication system, 100 wireless transmitter/receiver, 101 control unit, 102 storage unit, 103 interface unit, 104 management unit, 105 wireless transmission/reception unit, 200 indoor position authentication apparatus, 201 control unit, 202 storage unit, 203 communication unit, 300 user device, 400 NFC card reader apparatus.

The invention claimed is:

1. An indoor position authentication method comprising:
authenticating a plurality of wireless devices which are arranged indoors, and transmit wireless signals for calculating position information,
acquiring a number of the authenticated wireless devices from a terminal device which acquires position information on the basis of the wireless signals received from the authenticated wireless devices, the authenticated wireless devices being transmission sources of the wireless signals used as a basis for acquiring the position information, and
authenticating the position information acquired by the terminal device on the basis of the acquired number of the authenticated wireless devices,
wherein the authenticating the position information includes comparing the acquired number of the authenticated wireless devices to a preset threshold, the preset threshold being an integer that is greater than zero.

2. An indoor position authentication system comprising:
a plurality of wireless devices arranged indoors,
a terminal device located indoors, and receiving wireless signals transmitted by the wireless devices, and
an indoor position authentication apparatus connected to be communicable with the wireless devices and the terminal device, wherein
the wireless devices transmit wireless signals for acquiring position information,
the terminal device acquires position information on the basis of the wireless signals received from the wireless devices, and outputs information identifying at least a part of the wireless devices which are transmission sources of the wireless signals used as a basis for acquiring the position information, and
the indoor position authentication apparatus comprises at least one processor, the at least one processor executing,
a first authentication process for authenticating the wireless devices,
an acquiring process for acquiring, from the terminal, information regarding a number of the authenticated wireless devices, among the wireless devices which are transmission sources of the wireless signals used as a basis for acquiring the position information in the terminal device, and
a second authentication process for authenticating the position information acquired by the terminal device on the basis of the acquired number of the authenticated wireless devices,
wherein the second authentication process for authenticating the position information includes comparing the acquired number of the authenticated wireless devices to a preset threshold, the preset threshold being an integer that is greater than zero.

3. The indoor position authentication system according to claim 2, wherein in the second authentication process, the one or more processor of the indoor position authentication apparatus authenticates the position information acquired by the terminal device.

4. The indoor position authentication system according to claim 2, wherein
when the wireless device can receive wireless signals used as a basis for acquiring the position information, from an outdoor place, at the position where the wireless device is located, the wireless device receives the relevant wireless signals, and generates wireless signals to be transmitted, on the basis of the received wireless signals.

5. An indoor position authentication apparatus communicably connected to a plurality of wireless devices arranged indoors, and comprising at least one processor, the at least one processor executing:
a device authentication process for authenticating the plurality of wireless devices which transmit wireless signals for acquiring position information,
a process for acquiring information regarding a number of the authenticated wireless devices which are transmission sources of the wireless signals used as a basis for acquiring the position information, from the terminal device which acquires the position information on the basis of the wireless signals received from the authenticated wireless devices, and
a position authentication process for authenticating the position information acquired by the terminal device on the basis of the acquired number of the authenticated wireless devices, wherein:
the indoor position information authentication apparatus records authenticated position information acquired by the terminal device, and holds a history of the recorded position information, and
the history held thereby is provided for a process for estimating a moving path of the terminal device, or a charging process on the basis of the moving path.

6. The indoor position authentication system according to claim 3, wherein
when the wireless device can receive wireless signals used as a basis for acquiring the position information, from an outdoor place, at the position where the wireless device is located, the wireless device receives the relevant wireless signals, and generates wireless signals to be transmitted, on the basis of the received wireless signals.

* * * * *